(12) United States Patent
Korenaga et al.

(10) Patent No.: US 6,964,528 B2
(45) Date of Patent: Nov. 15, 2005

(54) OPTICAL MOUNT SUBSTRATE, OPTICAL MODULE, OPTICAL TRANSMITTER-RECEIVER, OPTICAL TRANSMITTER-RECEIVER SYSTEM, AND MANUFACTURING METHOD OF OPTICAL MOUNT SUBSTRATE

(75) Inventors: Tsuguhiro Korenaga, Katano (JP); Hiroyuki Asakura, Osaka (JP); Masanori Iida, Katano (JP); Hisashi Adachi, Minoo (JP); Mikihiro Shimada, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 163 days.

(21) Appl. No.: 10/110,659
(22) PCT Filed: Aug. 9, 2001
(86) PCT No.: PCT/JP01/06855
§ 371 (c)(1), (2), (4) Date: Aug. 26, 2002
(87) PCT Pub. No.: WO02/14917
PCT Pub. Date: Feb. 21, 2002

(65) Prior Publication Data
US 2003/0021550 A1 Jan. 30, 2003

(30) Foreign Application Priority Data
Aug. 17, 2000 (JP) ...................... 2000-247686

(51) Int. Cl.⁷ ................................ G02B 6/42
(52) U.S. Cl. .................... 385/88; 385/92; 385/49
(58) Field of Search .............. 385/88, 92, 49

(56) References Cited

U.S. PATENT DOCUMENTS

| | | | |
|---|---|---|---|
| 5,559,914 A | 9/1996 | Asakura | |
| 5,621,837 A | 4/1997 | Yamada et al. | |
| 6,027,254 A | 2/2000 | Yamada et al. | |
| 6,164,836 A | 12/2000 | Yamada et al. | |
| 6,189,339 B1 * | 2/2001 | Hiraiwa | 65/17.3 |
| 6,329,065 B1 | 12/2001 | Ishida et al. | |

FOREIGN PATENT DOCUMENTS

| | | |
|---|---|---|
| JP | 6-67044 | 3/1994 |
| JP | 7-113924 | 5/1995 |
| JP | 7-218739 | 8/1995 |
| JP | 07-287141 | 10/1995 |
| JP | 8-78657 | 3/1996 |
| JP | 8-194137 | 7/1996 |
| JP | 8-204212 | 8/1996 |
| JP | 9-54227 | 2/1997 |
| JP | 9-246420 | 9/1997 |
| JP | 10-253856 A | 9/1998 |
| JP | 11-052159 A | 2/1999 |
| JP | 11-84180 | 3/1999 |
| JP | 11-218651 A | 8/1999 |
| JP | 2000-164992 A | 6/2000 |
| JP | 2000-199827 | 7/2000 |
| JP | 2000-216307 A | 8/2000 |

OTHER PUBLICATIONS

International Search Report corresponding to application No. PCT/JP01/06855.
English translation of Form PCT/ISA/210.
* cited by examiner Primary Examiner—Dean A. Reichard
Assistant Examiner—Jinhee Lee
(74) Attorney, Agent, or Firm—RatnerPrestia

(57) ABSTRACT

An optical mount substrate and a manufacturing method of the optical mount substrate. An optical fiber guide section for arranging and fixing an optical transfer section, having an optical waveguide or an optical fiber, is formed. An electrical conductivity member is embedded in the optical mount substrate so that it penetrates a first principal plane of an arrangement section for arranging an optical device optically connected with the optical waveguide or the optical fiber on the first principal plane, and a second principal plane of the arrangement section parallel to the first principal plane. The optical fiber guide section and the arrangement section are formed by pressing a mold member to a heated and softened substrate to transfer inversion geometry of the mold member onto the substrate. The electrical conductivity member, having a predetermined shape, is directly pressed onto the heated and softened substrate to embed it into the substrate.

17 Claims, 11 Drawing Sheets

OPTICAL MOUNT SUBSTRATE, OPTICAL MODULE, OPTICAL TRANSMITTER-RECEIVER, OPTICAL TRANSMITTER-RECEIVER SYSTEM, AND MANUFACTURING METHOD OF OPTICAL MOUNT SUBSTRATE

This application is a U.S. national phase application of PCT international application PCT/JP01/06855.

TECHNICAL FIELD

The present invention relates to an optical mount substrate, which performs the optical-electric conversion of signals mainly used for optical communication, an optical module, an optical transmitter-receiver, an optical communication system, and a manufacturing method of an optical mount substrate.

BACKGROUND ART

Owing to the penetration of an Internet at ordinary homes and the progress of digitization of image media, the importance of high-speed communication infrastructure in a gigabit class is growing. An optical communication system is expected as such a high-speed communication infrastructure.

By the way, one of obstructions of introducing such a high-speed system into a subscriber loop such as ordinary homes is the compatibility of performance of the system and cost.

Generally, an optical communication system is expensive although being superior in communication speed and communication quality in comparison with a radio system, which becomes the hindrance of spread.

In particular, in the case of the construction at an ordinary home, an optical module for optical-electric conversion is required for the home, and it is indispensable to supply this at a low cost. Thus, the establishment of technique for supplying an optical module, having the rapidity that is a feature of the optical communication, at a low cost is very important.

A PLC platform (a mount substrate equipped with an optical circuit, PLC: Planar Lightwave Circuit) is proposed as what is used for an optical module that realizes high-speed optical-electric conversion exceeding gigabit (refer to page 59 of "The second collection of latest data on optical communication technique" published by Optronics Co., Ltd.). In addition, the entire disclosure of page 59 of reference, "The second collection of latest data on optical communication technique" is incorporated herein by reference in its entirety.

FIG. 8 is a drawing showing a basic structure of an optical mount substrate that forms the PLC platform by conventional technique.

A PLC section 810 comprises a part of a substrate 80 (right portion of the substrate 80 in FIG. 8), and a quartz-based optical waveguide (an upper cladding 81, a core 82, and a lower cladding 83) formed in an upper part thereof, and performs optical signal branch and synthesis.

The optical device 84 such as a laser and a photodiode is mounted in an optical device mounting section 820 which is another part of the substrate 80 (a central part of the substrate 80 in FIG. 8), and performs optical-electric and electric to optical signal conversions. An electric wiring section 830 which is the remaining portion (a left portion of the substrate 80 of FIG. 8) of the substrate 80 connects a drive circuit with the optical device 84, and transmits a high frequency that is high-speed equal to or more than one GHz.

Reasons why silicon is used as a material of the substrate 80 are as follows.

Namely, the followings can be cited:
(1) Silicon is suitable for the formation of an optical waveguide which needs an elevated temperature process,
(2) Since silicon has good workability, a V groove for optical fiber alignment is easily processible, and
(3) Since having good thermal conductivity, silicon acts as a heat sink even if a laser or a semiconductor IC that acts as the optical device 84 is driven in high power, and hence it is possible to suppress the rise of device temperature.

Since silicon is excellent in heat radiation effectiveness in this manner, the optical device 84 is directly mounted in the substrate 80 made of silicon.

On the other hand, since silicon has comparatively large dielectric loss, a parasitic inductance and a parasitic capacitance in the electric wiring section 830 become problems on the occasion of using a high-frequency band in the above-described optical mount substrate.

Then, in order to reduce the dielectric loss in high frequencies as much as possible, as shown in FIG. 8, electrodes are formed in the electric wiring section 830 with the electric wiring 85 such as a coplanar line, and quartz-based glass 86 with small high-frequency loss is made into a thick film, and intervenes between the electric wiring 85 and substrate 80.

In addition, in order to perform the height alignment of the optical device 84 and PLC portion, a silicon terrace 87 that has a terrace-like cross section that exists only in this portion is provided.

Thereby, the transmission and reception of a digital signal in a several gigabit class become possible.

However, on such a PLC platform, a production process is very complicated and results at a high cost.

That is, the photolithography and etching for forming the silicon terrace 87 in a silicon substrate 80 are required. Furthermore, it is necessary to repeat multiple times steps such as photolithography, etching, thin film deposition, and high-precision polishing for forming the upper cladding 81, core 82, and lower cladding 83. In addition, the upper cladding 81, core 82, and lower cladding 83 constitute an optical waveguide.

The cost weight of the optical waveguide is especially high. Although the optical waveguide is manufactured with using semiconductor processes such as film formation by a flame hydrolysis deposition or a CVD, and core patterning by photolithography and etching, cost reduction effectiveness is not expectable even in mass production since chip size is comparatively large.

Another problem is that it is not easy to connect the optical waveguide with an optical fiber.

In order to suppress the optical loss due to the connection between the optical fiber and optical waveguide, in the case of a single mode, positioning, assembly, and fixing of $\pm 1\,\mu m$ or less are needed.

As the connection methods, the following two are common.

One is to form a V groove for arranging the optical fiber into a silicon portion of an edge (not shown in FIG. 8) of the optical waveguide, when the optical waveguide (the upper cladding 81, core 82, and lower cladding 83) is formed in the silicon substrate 80, as shown in FIG. 8. The optical fiber is connected with the optical waveguide by arranging and fixing the optical fiber to this V groove.

However, there are problems that not only a cost burden increases since another steps such as photolithography and wet etching are required for forming the V groove in the silicon substrate 80, but also the dispersion of the optical loss amount in the connection of the optical waveguide and an optical fiber arises in consequence since etching dispersion arises and hence the geometry accuracy of the V groove disperses.

Another is a method of independently and individually preparing a substrate that forms the optical waveguide, and a substrate in which the V groove, where the optical fibers are arranged, is formed, and performing the alignment of these optical axes by a system equipped with several axes of automatic adjusting mechanisms. Nevertheless, there are many and large problems in respect of mass production property and economical efficiency since it needs the time from dozens of seconds to several minutes to adjust every connection and facility is also expensive.

As methods of solving problems relating to the manufacture of such an optical waveguide and the connection of the optical waveguide and optical fiber, methods of manufacturing an optical waveguide by forming a groove for fixing and a groove corresponding to a core of the optical waveguide in a fiber by press-forming, which has been already put in practical use as a manufacturing method of aspheric surface glass, and filling a core material such as a resin in the groove corresponding to the core are proposed in Japanese Patent Laid-Open No. 7-287141, Japanese Patent Laid-Open No. 7-113924, Japanese Patent Laid-Open No. 7-218739, etc.

In addition, the entire disclosure of reference "Japanese Patent Laid-Open No. 7-287141", "Japanese Patent Laid-Open No. 7-113924", and "Japanese Patent Laid-Open No. 7-218739" are incorporated herein by reference in its entirety.

This method is, for example, to transfer inversion geometry by pressing a mold die, which is equipped with concave and convex geometry corresponding to a fiber fixing portion and an optical waveguide portion, to a processed object as shown in FIG. 9, and can manufacture plenty of fiber fixing guides and optical waveguide grooves with sufficient geometry reproducibility. Here, "91" denotes an optical fiber guide groove forming section, and "92", denotes an optical waveguide pattern molded section.

If core material such as a resin is embedded in the optical waveguide groove, it is possible to make the optical waveguide groove function as an optical waveguide, and hence, it becomes possible to optically connect the optical fiber with the optical waveguide simply and highly efficiently without performing special positioning just by arranging the optical fiber into the groove by transferring geometry with a die where relative positions of respective grooves for the fiber and optical waveguide are accurate.

Thus, owing to the use of the press forming, as shown in FIG. 10, it becomes possible to realize an optical mount substrate 103 having an optical waveguide 101 and an optical fiber guide groove 102, and hence it becomes possible to reduce the manufacturing cost of the optical waveguide and the connection cost of the optical fiber.

However, if optical devices such as a laser and a photodiode, and circuits which drive these are provided in such an optical mount substrate 103, there is a restriction that heat cannot be easily released and hence the optical devices can be driven only in low power since it is necessary to form them on glass having thermal conductivity worse than silicon.

In addition, in any one of the optical mount substrate 103 in FIG. 10 and the PLC platform in FIG. 8, since a leading lead is needed if an electric device such as a capacitor is provided in an electric wiring ("85" in FIG. 8 and not shown in FIG. 10) used as an electrode portion, loss arises in a high-frequency band, which becomes an abuse to acceleration.

Thus, in the present situation, there is a subject that optical mount substrates and optical modules that have the rapidity in a gigabit class, cost which is suitable for being supplied to ordinary homes, and productivity cannot be supplied.

DISCLOSURE OF THE INVENTION

The present invention is achieved in view of the above-described subjects, and aims to provide an optical mount substrate, an optical module, an optical transmitter-receiver, and an optical transmitter-receiver system that have the outstanding heat radiation effectiveness in spite of the structure simpler than conventional ones.

Moreover, the present invention aims at providing an optical mount substrate, an optical module, an optical transmitter-receiver, and an optical transmitter-receiver system that can further reduce loss in a high-frequency band in comparison with conventional ones.

Furthermore, the present invention aims at providing a manufacturing method of an optical mount substrate that can further simplify a production process.

One aspect of the present invention is an optical mount substrate comprising:

an optical fiber guide section for arranging and fixing an optical transfer section, having an optical waveguide, and/or an optical fiber; and an arrangement section for arranging an optical device optically connected with the optical waveguide or the optical fiber on a principal plane, wherein through holes that penetrate the principal plane of the arrangement section and a principal plane in another side are provided in the arrangement section.

Another aspect of the present invention is the optical mount substrate, wherein an electrical conductivity member is embedded in the through holes, and the electrical conductivity member is electrically connectable with the optical device.

Still another aspect of the present invention is the optical mount substrate, wherein a heat transfer member containing a thermal conductivity material is embedded in the through holes; and the heat transfer member is connectable with the optical device heat conductively.

Yet still another aspect of the present invention is an optical mount substrate comprising:

an optical fiber guide section for arranging and fixing an optical transfer section, having an optical waveguide, and/or an optical fiber; and an arrangement section for arranging an optical device optically connected with the optical waveguide or the optical fiber on a principal plane, wherein an electrical conductivity member, which penetrates the principal plane of the arrangement section and a principal plane in another side and is electrically connectable with the optical device, is provided in the arrangement section.

Still yet another aspect of the present invention is an optical mount substrate comprising:

an optical fiber guide section for arranging and fixing an optical transfer section, having an optical waveguide, and/or an optical fiber; and an arrangement section for arranging an optical device optically connected with the optical waveguide or the optical fiber on a principal plane, wherein a thermal conductivity member containing a thermal conductivity material, which penetrates the principal plane of the arrangement section and a principal plane in another side and is connectable with the optical device heat-conductively, is provided in the arrangement section.

A further aspect of the present invention is the optical mount substrate, wherein the optical transfer section and/or the optical fiber guide section, and the arrangement section are constituted with the same material in a body.

A still further aspect of the present invention is the optical mount substrate, wherein the arrangement section is glass.

A yet further aspect of the present invention is the optical mount substrate, wherein length of a penetration part of the electrical conductivity material is 500 µm or less on the basis of the thickness direction of the arrangement section.

A still yet further aspect of the present invention is the optical mount substrate wherein thermal conductivity of the heat transfer member is larger than thermal conductivity of the arrangement section.

An additional aspect of the present invention is the optical mount substrate, wherein a heat radiation member containing the thermal conductivity material is connected with the heat transfer member so as to be thermally conductive, and is provided in all or a part of the other principal plane of the arrangement section.

A still additional aspect of the present invention is the optical mount substrate, wherein the arrangement section has alignment markers for aligning the optical device.

A yet additional aspect of the present invention is the optical mount substrate, wherein further comprises a second optical device provided on the optical waveguide.

A still yet additional aspect of the present invention is an optical module comprising:

the optical mount substrate;

the optical fiber; and a photo detector or a light emitting device as the optical device.

A supplementary aspect of the present invention is an optical transmitter-receiver comprising:

an optical module; and an electric signal processing circuit.

A still supplementary aspect of the present invention is an optical transmitter-receiver system comprising:

an optical transmitter-receiver; and an optical signal transmission line in one end and the other end of which the optical transmitter-receiveres are connected.

A yet supplementary aspect of the present invention is a manufacturing method of an optical mount substrate comprising:

a step of forming an optical fiber guide section for arranging and fixing an optical transfer section, having an optical waveguide, or an optical fiber; and a through hole formation step of forming a through hole which penetrates a principal plane of an arrangement section for arranging an optical device optically connected with the optical waveguide or the optical fiber on the principal plane, and a principal plane in another side.

A still yet supplementary aspect of the present invention is the manufacturing method of an optical mount substrate comprising an electrical conductivity material filling step of filling the through holes with an electrical conductivity material.

Another aspect of the present invention is the manufacturing method of an optical mount substrate comprising a thermal conductivity material filling step of filling at least the through holes with a thermal conductivity material having thermal, conductivity larger than the arrangement section.

Still another aspect of the present invention is a manufacturing method of an optical mount substrate comprising:

a step of forming an optical fiber guide section for arranging and fixing an optical transfer section, having an optical waveguide, or an optical fiber; and an embedding step of embedding an electrical conductivity member so that the electrical conductivity member may penetrate a principal plane of an arrangement section for arranging an optical device optically connected with the optical waveguide or the optical fiber on the principal plane, and a principal plane in another side.

Yet sill another aspect of the present invention is a manufacturing method of an optical mount substrate comprising:

a step of forming an optical fiber guide for arranging and fixing an optical transfer section, having an optical waveguide, and/or an optical fiber; and an embedding step of embedding a thermal conductivity member containing a thermal conductivity material so that the thermal conductivity material may penetrate a principal plane of an arrangement section for arranging an optical device optically connected with the optical waveguide or the optical fiber on the principal plane, and a principal plane in another side.

Still yet another aspect of the present invention is the optical mount substrate comprising a softening step of heating and softening a substrate with a predetermined refraction index for forming the optical transfer section and/or the optical fiber guide section, and the arrangement section in a body, wherein the optical transfer section and/or the optical fiber guide section, and the through holes of the arrangement section are formed in a body by pressing a predetermined mold member to the substrate softened.

A further aspect of the present invention is the manufacturing method of an optical mount substrate comprising a heat radiation member arrangement step of forming a heat radiation member, containing a thermal conductivity material, in all or a part of the principal plane in the other side of the arrangement section, and connecting it with the heat transfer member heat-conductively.

A still further aspect of the present invention is the manufacturing method of an optical mount substrate, wherein the heat transfer member is formed in a body with the heat radiation member containing above-described thermal conductivity material, and in the embedding step, the heat radiation member is formed in all or a part of the principal plane in the other side of the arrangement section at the same time when the heat transfer member is embedded.

Figure 1:
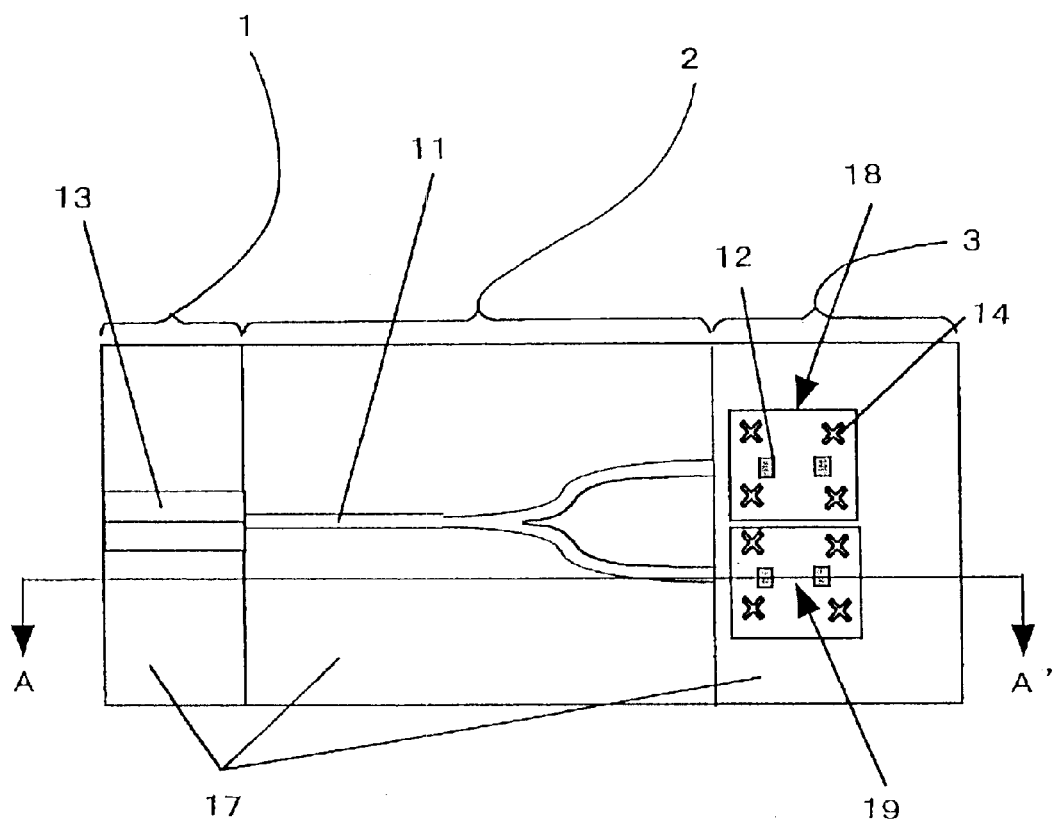
FIG. 1(a) is a plan view showing a configuration of an optical mount substrate of the present invention in a first embodiment.
FIG. 1(b) is a sectional view that is taken along a line A–A' and shows the configuration of the optical mount substrate of the present invention in the first embodiment.
Figure 1:
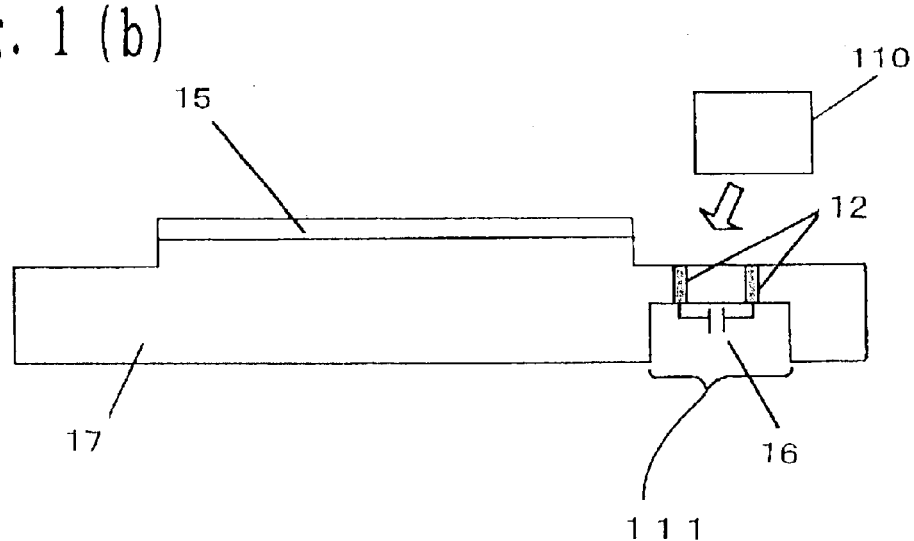

REFERENCE NUMERALS 11, 24, 41, 54, 61, 72, 101 Optical waveguide grooves
12 Via hole
13, 43, 64, 102 Fiber arranging V grooves
14, 44, 65 Alignment markers
15, 26, 45, 56 Plate glass members
16 Microcapacitor
17, 46 Glass substrate
18, 47, 67 Laser mounting sections
19, 48, 68 Photodiode mounting sections
21, 51 Upper dies
22 Lower die
23, 53 Glass substrates
25, 55 Ultraviolet cure resins
31, 71, 103 Optical mount substrates
32 Optical waveguide
33, 73 Optical fibers
34, 74, 49 Lasers
35, 75,110 Photodiodes
36 Electrode
42, 410 High thermal conductivity materials
52 High thermal conductivity member
62 Groove
63 Wavelength filter
66 Electrical conductivity material (via hole)
76 Laser driver
77 Preamplifier
81 Upper cladding
82 Core
83 Lower cladding
84 Optical device
85 Electric wiring
86 Quartz-based glass
87 Silicon terrace
91 Optical fiber guide groove forming section
92 Optical waveguide pattern molded section

BEST MODE FOR CARRYING OUT THE INVENTION

Hereafter, preferable embodiments of the present invention will be described with referring to drawings.
(First Embodiment)

FIG. 1(a) and FIG. 1(b) show a configuration of an optical mount substrate of the present invention.

In addition, FIG. 1(a) is a plan of the optical mount substrate of this embodiment, and FIG. 1(b) is a sectional view taken along a line A–A' in FIG. 1(a).

The optical mount substrate of this embodiment is composed of glass, and as shown in the drawing, an optical fiber guide section 1 for arranging and fixing an optical fiber, an optical transfer section 2 having an optical waveguide 27 (refer to FIG. 2(b)), and an arrangement section 3 for arranging a laser or a photodiode 110 as an optical device which is optically connected with an optical waveguide 27.

Furthermore, describing it in detail, as shown in FIG. 1(a) and FIG. 1(b), it comprises a glass substrate 17, an optical waveguide groove 11 formed on the glass substrate 17, an ultraviolet cure resin (not shown) that has a refraction index higher than the glass substrate 17 and is filled in the optical waveguide groove 11, via holes 12 which are through holes filled with conductive paste, and a fiber arranging V groove 13 that is formed on the glass substrate 17 and is for fixing the optical fiber.

Moreover, it further comprises a laser mounting section 18 and a photodiode mounting section 19 that are formed on the glass substrate 17 in the positions which become symmetrical with the fiber arranging V groove 13 in view of the optical waveguide groove 11 and are for arranging optical devices such as a laser and a photodiode 110, and alignment markers 14 which align optical devices.

Furthermore, a plate glass member 15 that has a refraction index equivalent to the glass substrate 17 is bonded on a part of the glass substrates 17 including the optical waveguide groove 11 so that the optical waveguide groove 11 may be sealed. In addition, a back face including the via holes 12 in the glass substrate 17 is partially hollowed in order to shorten wire length. Circuit elements such as a microcapacitor 16 are arranged in the hollow part (concavity 111) in a form of being connected to a plurality of via holes.

Next, an example of desirable manufacture procedure of the optical mount substrate according to this embodiment like this will be shown in FIG. 2(a) to FIG. 2(d).

Here, an upper die 21 having a convex optical waveguide pattern 21a and a convexity 21b for forming a fiber arranging V groove, and a marker pattern forming section (not shown) for aligning optical devices, and a lower die 22 for molding the through holes 12 and a back side concavity 111 (refer to FIG. 1(b)) are used.

That is, first, inversion geometry is transferred on a glass substrate 23 (FIG. 2(b)) by pressing the above-described upper die 21 and lower die 22 (FIG. 2(a)) against the upper surface and lower surface of the glass substrate 23 heated and softened.

Next, an ultraviolet cure resin 25 with a refraction index higher than the glass substrate 23 is applied to a principal plane of a part including at least the optical waveguide groove 24 of the glass substrate 23 so that the inside of the optical waveguide groove 24 may be embedded. Thickness is made thin with using spin coating etc. at the time of application (FIG. 2(c)).

Finally, the plate glass member 26 with a refraction index almost equivalent to the glass substrate 23 is bonded to an optical waveguide portion, through holes 27 are filled with electroconductive paste (not shown), and a microcapacitor (not shown) is mounted (FIG. 2(d)). Thus, the optical mount substrate in FIG. 1 is completed.

The optical mount substrate of this embodiment functions as a base substrate of an optical transmission-reception module.

Thus, just by installing an optical fiber in the V groove 13 and fixing this with optical adhesives etc., connection between the optical fiber and optical waveguide is attained. Up to now, although the position accuracy in a submicron level is required for connection of these, significant reduction of adjustment cost is possible in this mount substrate.

In addition, passive alignment becomes possible by using the alignment markers 14 simultaneously formed by molding in the mounting of optical devices such as a laser and a photodiode. At this time, the laser and photodiode are arranged respectively on a height stage where light emission and light reception height meets the optical waveguide. Such a step also can be easily formed with a molding method.

Figure 2:
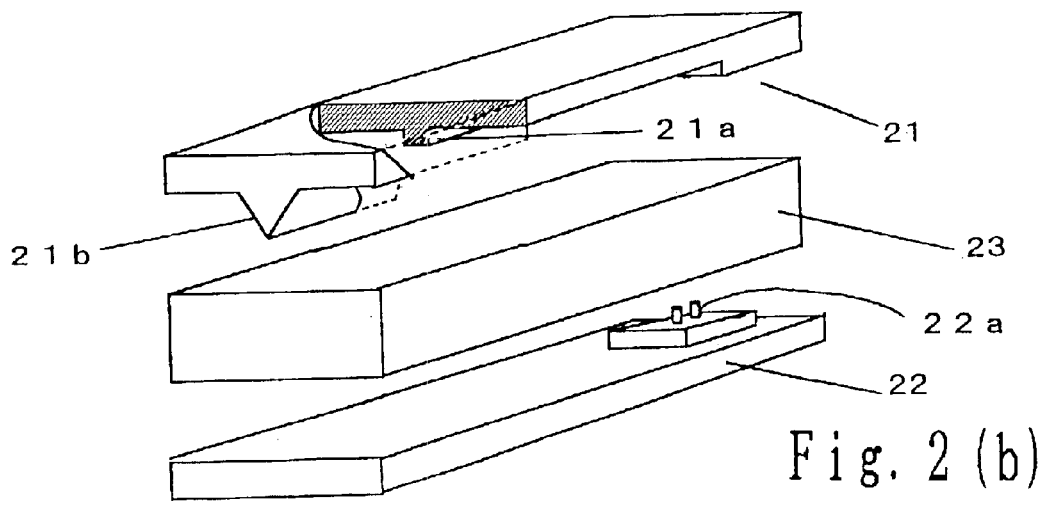
FIG. 2(a) to FIG. 2(d) are perspective views showing the manufacture procedure of the optical mount substrate in the first embodiment.
Figure 2:
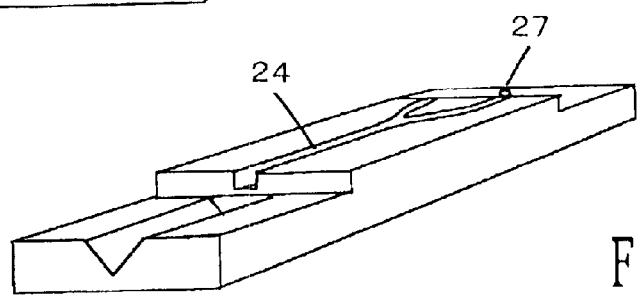
Figure 2:
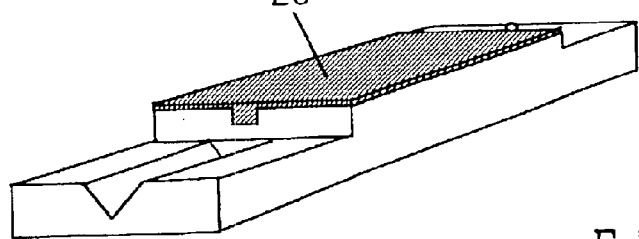
Figure 2:
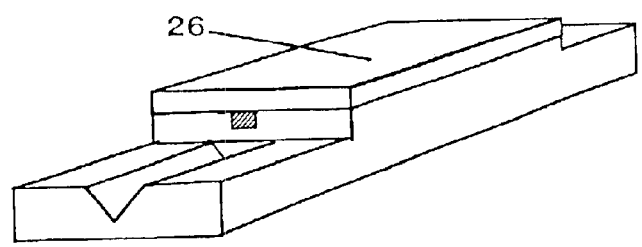

The optical mount substrate of the present invention can be manufactured without using steps such as photolithography, etching, thin film deposition, and high-precision polishing. In particular, if the molding method shown in FIG. 2 is used, it becomes possible to perform mass production at a very low cost. However, besides this manufacturing method, but, for example, only the optical waveguide groove 11 may be formed by the molding method, and another means such as machining may also be used for the via holes 12.

Although glass is used for a substrate material in this embodiment, it will not be restricted to this so long as being optically transparent. For example, if it is various thermoplastics, such as a polyolefine, and glass, the molding method is possible and is advantageous in respect of cost.

In particular, since glass has small dielectric loss in comparison with silicon etc., it is possible to lessen high-frequency loss in a transmission line connected to a laser or a photodiode, and it is very effective as what is for high-speed communication modules.

When rapidity is needed, a coplanar line, a microstrip line, or a slotted line is desirable as a transmission line.

In addition, because wire length becomes short since the optical mount substrate of the present invention provides the via holes 12 in the direction of substrate thickness, it is possible to obtain flat gain characteristics and group delay characteristics in a wide high-frequency band, and hence it is advantageous for high-speed communication applications.

It is desirable to use solder, for example, conductive paste mainly made of silver, copper, nickel, etc., or electroconductive adhesive especially as an electrical conductivity material with which through holes are filled.

In addition, as for wire length, it is desirable in view of high frequency characteristics to make it be 500 $\mu$m or less. Therefore, it is also good to make the thickness of a glass substrate itself be 500 $\mu$m or less without forming the concavity 111 besides the means of shortening wire length by providing the concavity 111 on a back face like this embodiment. At this time, a metal layer etc. can be formed in the back face of the substrate.

In addition, not only a high-frequency device such as a microcapacitor, but also another high-frequency device can be used as the device connected between via holes. Moreover, a high-frequency circuit is also sufficient.

In this embodiment, as shown in FIG. 2(a) to FIG. 2(d), it is performed with the upper die 21 having an optical waveguide pattern 21a, a convexity 21b for forming an optical fiber arrangement V groove, etc., and the lower die 22 having a projection 22a for molding the via holes 12.

In particular, if a substrate is made to be thin and there is no need for the concavity 111 in a back face, it is also good to provide projections for the optical waveguide pattern and via holes in the same mold die.

Moreover, it is most desirable to form the optical waveguide groove 11, via holes 12, and fiber arranging V groove 13 in one piece as the same substrate by the molding method like this embodiment, since it becomes unnecessary to align positions at the time of component assembly. However, besides this, for example, when using another method except the molding method for forming the via holes 12 (for example, a drilling method with a drill), it is also good to adopt, for example, the structure of providing via holes in a plate glass member side.

In addition, in this case, unlike the structure shown in FIG. 1(a), there is no arrangement section in a glass substrate, and an optical fiber guide section and an optical transfer section are provided. Then, the right end of the plate glass member 15 shown in FIG. 1(b) is extended further rightward, and the extended part serves as an arrangement section for mounting optical devices. In this case, the optical devices are mounted in the back face of the plate glass member. Therefore, as described above, it is necessary to provide via holes in the arrangement section of the plate glass member.

In addition, although it is desirable to use an ultraviolet cure resin used in this embodiment or a thermosetting resin as a core material, it is also good to deposit a quartz-based thin film so that the groove may be embedded and to remove excessive portions other than the groove by polishing etc.

Furthermore, although the example having the optical waveguide grooves 11 and 24 are shown in this embodiment, the effectiveness of the present invention is not spoiled at all even if this is not provided.

In FIG. 1, it is also good to make it possible to directly connect the optical fiber with the optical devices by providing the fiber arranging V groove 13 with being extended to a part of mounting the optical devices such as a laser and a photodiode.

(Second Embodiment)

Figure 3:
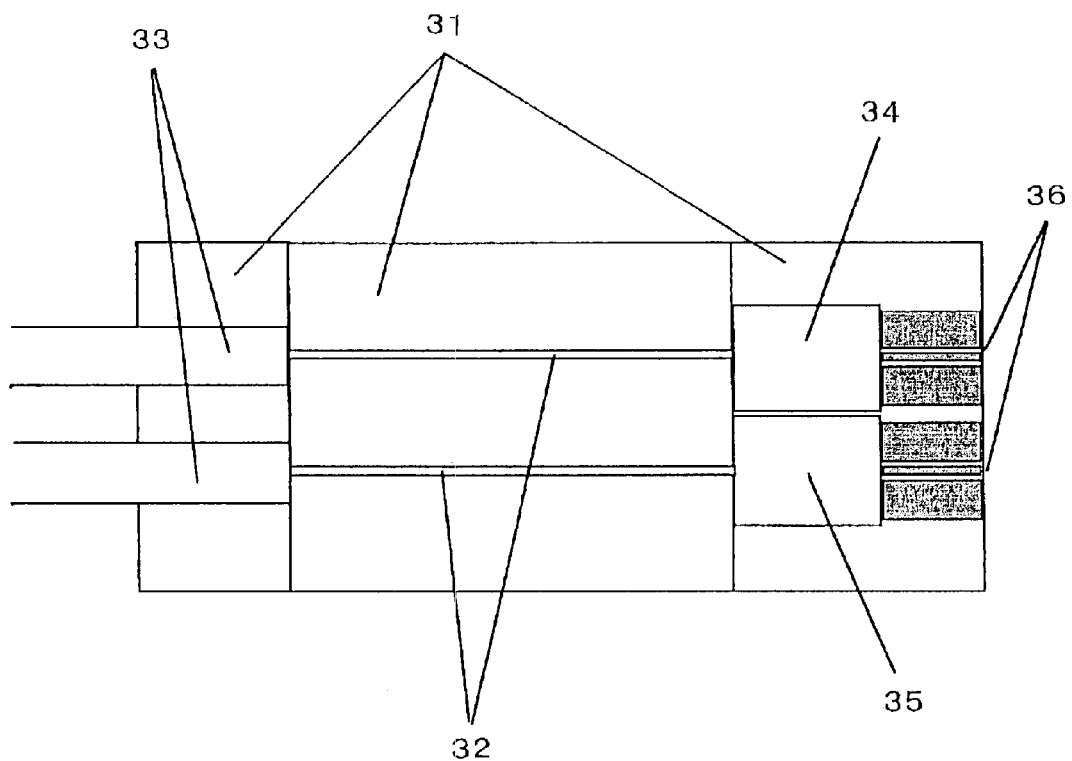
FIG. 3 is a configurating diagram of an optical mount substrate of the present invention in a second embodiment.

FIG. 3 shows a configuration of an optical module of the present invention.

In FIG. 3, an optical mount substrate 31 is constituted by using an optical mount substrate, whose fundamental structure is the same as that of the first embodiment, as a base. The optical mount substrate 31 comprises two optical waveguides 32, and further comprises an optical fiber 33, a laser 34 and a photodiode 35 as optical devices, and electrodes 36 of coplanar transmission lines.

The formation of the electrodes 36 may also be performed by forming a chromium film as the groundwork in order to secure adhesion with the glass that is a substrate material, and may provide golden electrodes on this by plating. Alternatively, it is also possible to use a method such as printing.

Thus, a high-speed optical module is easily realizable by using the optical mount substrate of the present invention.

It is more desirable to use the mounting procedure for short connection such as flip chip mounting and stud bump mounting in the case of acceleration being required in particular although wire bonding may be performed in regard to the mounting of the laser and photodiode.

In addition, although the optical waveguide pattern with bifurcation is shown in the first embodiment, it is not restricted to this in particular, but there may be two or more optical waveguide patterns like this second embodiment.

In particular, it is more desirable to provide an optical waveguide pattern in each of transmission and reception, since the optical incidence of a laser becomes noise in analog communication and high-speed digital communication.

(Third Embodiment)

FIG. 4(a) and FIG. 4(b) show a configuration of an optical mount substrate of the present invention.

In addition, FIG. 4(a) is a plan of the optical mount substrate of this embodiment, and FIG. 4(b) is a sectional view taken along a line B–B' in FIG. 4(a).

The optical mount substrate of this embodiment is composed of glass, and as shown in FIG. 4(a) and FIG. 4(b), comprises a glass substrate 46, an optical waveguide groove 41 formed on the glass substrate 46, an ultraviolet cure resin (not shown) that has a refraction index higher than the glass substrate 46 and is filled in the optical waveguide groove 41, a high thermal conductivity member 42 containing a high thermal conductivity material, a fiber arranging V groove 43 that is for fixing an optical fiber and is formed on the glass substrate 46, a laser mounting section 47 and a photodiode mounting section 48 for arranging optical devices such as a laser 49 and a photodiode, and alignment markers 44 which align optical devices.

Furthermore, a plate glass member 45 that has a refraction index equivalent to the glass substrate 46 is bonded on a part of the glass substrates 46 including the optical waveguide groove 41 so that the optical waveguide groove 41 may be sealed. Various metal such as copper, silicon, or the like are cited as a high thermal conductivity material.

Figure 4:
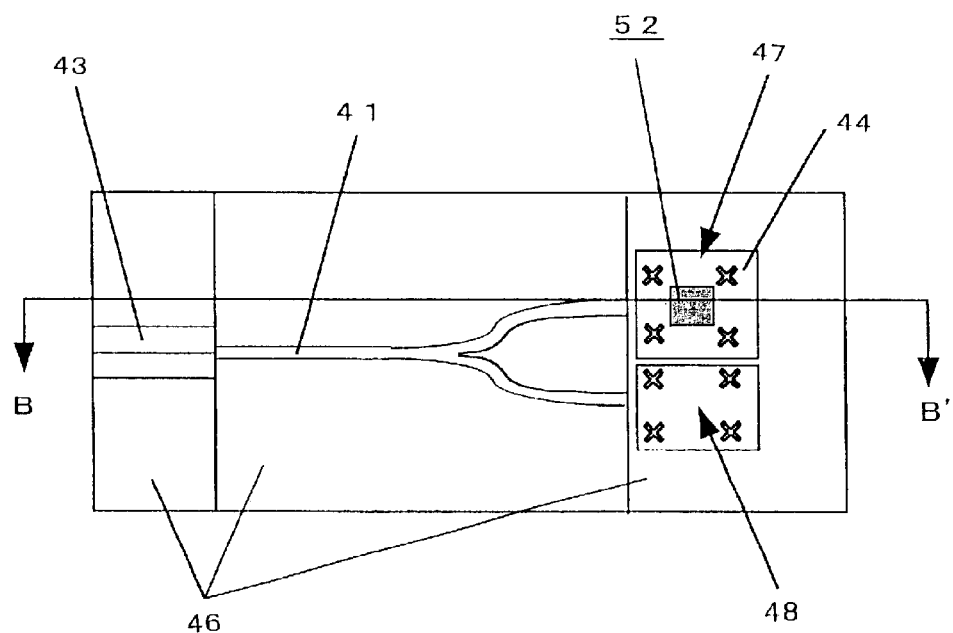
FIG. 4(a) is a plan view showing the configuration of an optical mount substrate of the present invention in a third embodiment.
FIG. 4(b) is a sectional view that is taken along a line B–B' and shows the configuration of the optical mount substrate of the present invention in the third embodiment.
Figure 4:
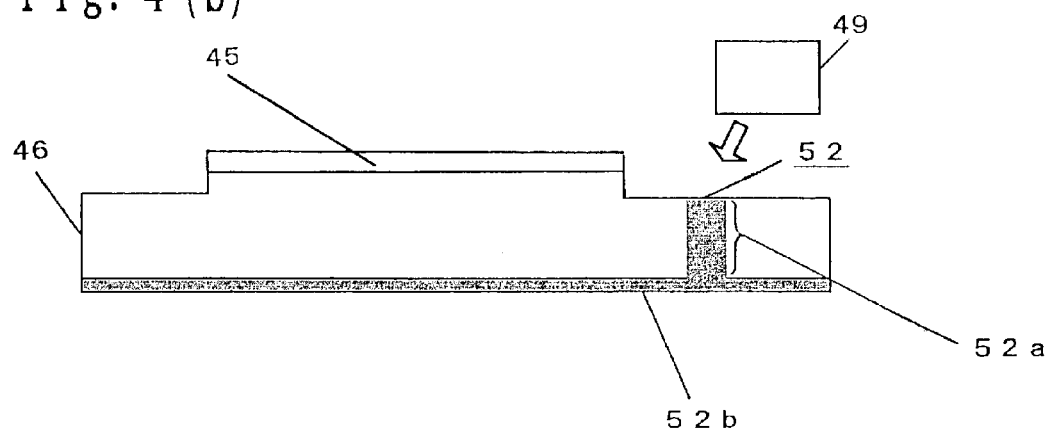
Figure 5:
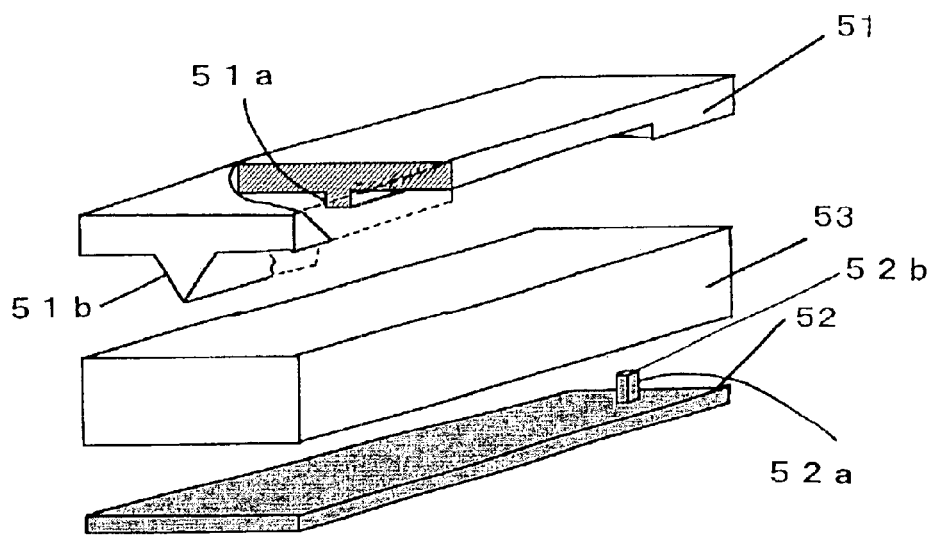
FIG. 5(a) to FIG. 5(d) are perspective views showing the manufacture procedure of the optical mount substrate in the third embodiment.
Figure 5:
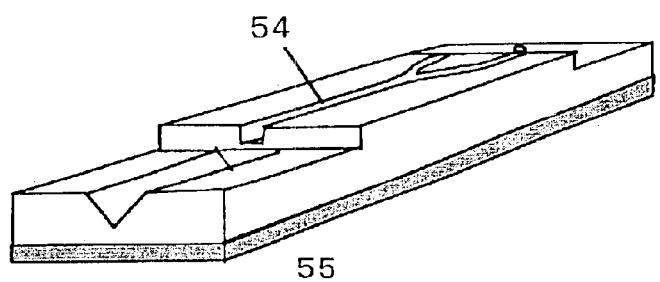
Figure 5:
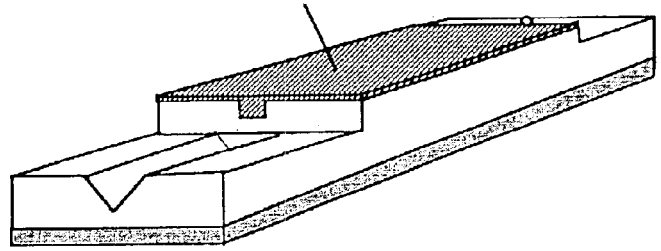
Figure 5:
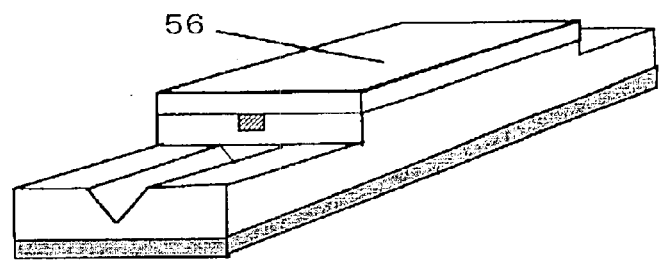

In addition, in this embodiment, as shown in FIG. 4(b) and FIG. 5(a), a high thermal conductivity member 52 comprises a heat transfer member 52a and a heat radiation member 52b in a body.

Next, an example of the desirable manufacture procedure of an optical mount substrate according to the present embodiment like this will be shown in FIG. 5(a) to FIG. 5(d).

Here, an upper die 51 having a convex optical waveguide pattern 51a and a convexity 51b for forming a fiber arranging V groove, and a marker pattern forming section (not shown) for aligning optical devices, and a high thermal conductivity member 52 which is made of good thermal conductivity material and has a projection (heat transfer member 52a) on a surface thereof are used. Here, the high thermal conductivity member 52 is an example of a member containing the heat transfer member and heat radiation member of the present invention.

That is, first, with transferring inversion geometry on the glass substrate 53 by pressing the above-described upper die 51 and high thermal conductivity member 52 against upper and lower surfaces of the glass substrate 53, which is heated and softened, respectively (FIG. 5(a)), the high thermal conductivity member 52 is embedded into the glass substrate 53 (FIG. 5(b)).

If being embedded into the glass substrate 53 at this time, an end portion 52b of a projection of the high thermal conductivity member 52 is made to be exposed by the surface of the glass substrate 53 being polished.

Although high accuracy is unnecessary to align upper and lower dies at the time of molding the glass substrate 53, alignment accuracy can be secured if a blow mold regulating misalignment of the upper and lower dies is provided.

In addition, the high thermal conductivity member 52 is provided in order to make the heat, which is caused by a laser 49 mounted on the glass substrate 46, efficiently radiated.

Next, an ultraviolet cure resin 55 with a refraction index higher than the glass substrate 53 is applied to a principal plane of a part of the glass substrate 53 that includes at least the optical waveguide groove 54.

Thereby, the ultraviolet cure resin 55 is made to be embedded in the optical waveguide groove 54. At the time of application, thickness is made thin with using spin coating etc. (FIG. 5(c)).

Finally, a plate glass member 56 that has a refraction index almost equivalent to the glass substrate 53 is bonded on an optical waveguide portion (FIG. 5(d)). Thus, the optical mount substrate in FIG. 4 is completed.

This optical mount substrate functions as a base substrate of an optical transmission-reception module. Thus, the connection of an optical fiber and an optical waveguide is attained just by installing the optical fiber in the V groove 43 and fixing this with optical adhesives etc. Up to now, although the position accuracy in a submicron level is required for the connection of these, significant reduction of adjustment cost is possible in this mount substrate.

In addition, passive alignment becomes possible by using the alignment markers 44 simultaneously formed by molding in the mounting of optical devices such as a laser and a photodiode. The optical mount substrate of the present invention can be manufactured without using any steps such as a photolithography, etching, thin film deposition, and high-precision polishing.

In particular, if the molding method shown in FIG. 5(a) to FIG. 5(d) is used, it becomes possible to perform mass production at a very low cost. However, besides this manufacturing method, but, for example, only the optical waveguide groove 41 may be formed by the molding method, and another means such as machining may also be used for the high thermal conductivity material 42 for drilling through holes, and then, a paste-like material may also be embedded.

Although glass is used for a substrate material in this embodiment, it will not be restricted to this so long as being optically transparent. For example, if it is each type of thermoplastic, such as a polyolefine, or glass, the molding method is applicable and is advantageous in respect of cost.

The optical mount substrate of the present invention has the high thermal conductivity material 42 in the direction of substrate thickness, and hence, by arranging this just under amount section of a laser or a semiconductor IC, this is made to function as a heat sink, and therefore, it is possible to prevent the performance degradation and damage of the device due to temperature rise.

In this embodiment, although molding is performed by sandwiching a glass substrate with the upper die 21, having the optical waveguide groove, and the high thermal conductivity substrate 22 as shown in FIG. 2, it is also good to embed it into a glass substrate by arranging and molding a high thermal conductivity material in a part of an upper die side. Anyway, when making a high thermal conductivity material embedded in a projecting shape by molding, such geometry of the projection that the geometry gradually becomes thin toward an end is more desirable.

In addition, although it is most desirable since it becomes unnecessary to perform alignment at the time of component assembly by forming the optical waveguide groove 41, high thermal conductivity material 42, and fiber arranging V groove 13 in the same substrate like this embodiment, this is not only one method at the time of using a method other than the molding method, for example, it is good to provide a high thermal conductivity material in the plate glass member 45.

In addition, although it is desirable to use an ultraviolet cure resin used in this embodiment or a thermosetting resin as a core material, it is also good to deposit a quartz-based thin film so that the optical waveguide groove 54 may be embedded and to remove excessive portions other than the groove by polishing etc.

In addition, the optical module of the second embodiment as shown in FIG. 3 can be similarly constituted on the basis of the optical mount substrate of this embodiment.

In addition, it is needless to say that it is still more effective if the via holes of the first embodiment and the high thermal conductivity material portion of this embodiment are simultaneously provided in the same optical mount substrate, which can also be used so as to serve as electric wiring and heat radiation via holes.

In addition, the high thermal conductivity material portion can also be provided with being extended not to the entire surface of the glass substrate 46 but to a part thereof according to a case.

(Fourth Embodiment)

Figure 6:
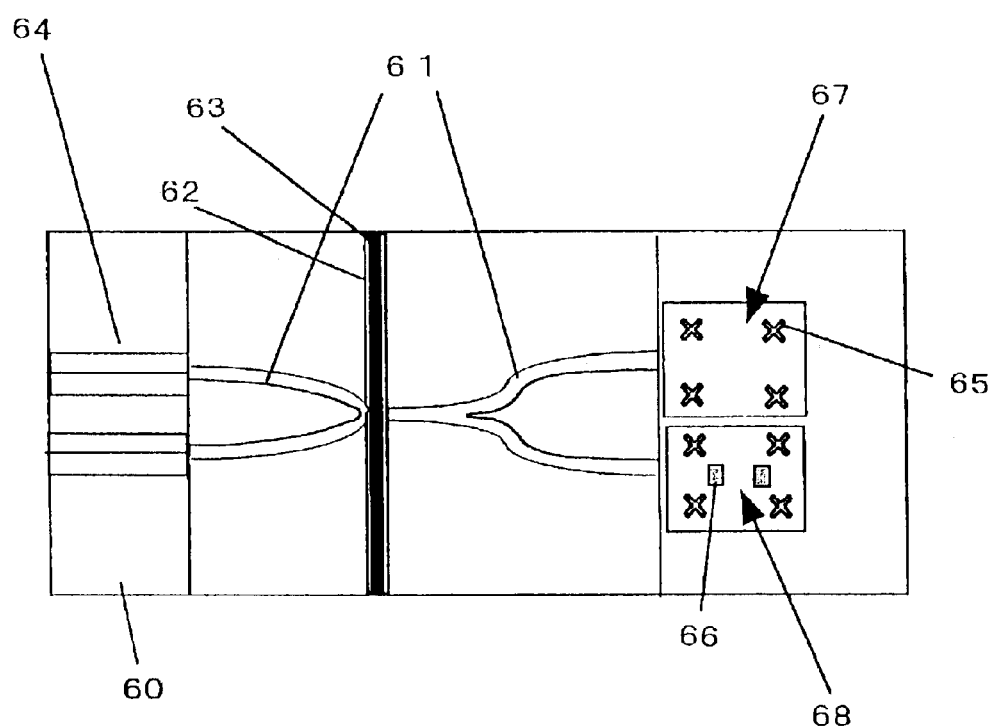
FIG. 6 is a configurating diagram of an optical mount substrate of the present invention in a fourth embodiment.

FIG. 6 shows a configuration of an optical mount substrate of the present invention.

In FIG. 6, the optical mount substrate 31 is constituted by making an optical mount substrate, having the same fundamental configuration as the first embodiment, be a base.

That is, the optical mount substrate 31 of this embodiment comprises an optical waveguide groove 61, an ultraviolet cure resin (not shown) that has a refraction index higher than a glass substrate 60 and is filled in the optical waveguide groove 61, and a groove 62 which crosses the optical waveguide formed by the optical waveguide groove 61.

Moreover, the optical mount substrate 31 of this embodiment further comprises a wavelength filter 63 which is inserted into, bonded with, and fixed to this groove 62, a fiber arranging V groove 64 for fixing an optical fiber, and alignment markers 65 which align optical devices such as a laser and a photodiode.

Furthermore, a plate glass member (not shown) that has a refraction index equivalent to the substrate is bonded on the optical mount substrate 31 so that the optical waveguide groove 61 may be sealed.

The wavelength filter 63 is made by laminating a plurality of dielectric materials on polyimide or the like, and has a function of performing separation according to wavelength by the reflection and a transmission of light. Thus, it is possible to use this also for large-capacity and high-speed wavelength multiplex applications.

Although a wavelength filter is provided in the middle of the optical waveguide in this embodiment, besides this, an isolator, a mirror, a half mirror, an attenuation filter, etc. are sufficient. Dozens of microns or less of groove width is desirable.

Alternatively, it is also good to make the groove width be several mm or several cm, to provide an optical waveguide by ion exchange or the like in a substrate made of LiNbO3 or the like, and to incorporate an external modulator which is given electrodes.

Thus, similarly to a conventional PLC module, it is possible in the optical mount substrate of the present invention to add various optical devices to an optical waveguide portion.

In addition, although this embodiment is described as what is constituted by an optical mount substrate whose base is the optical mount substrate of the first embodiment, it is also good as what is constituted by the optical mount substrate according to the third embodiment.

(Fifth Embodiment)

Figure 7:
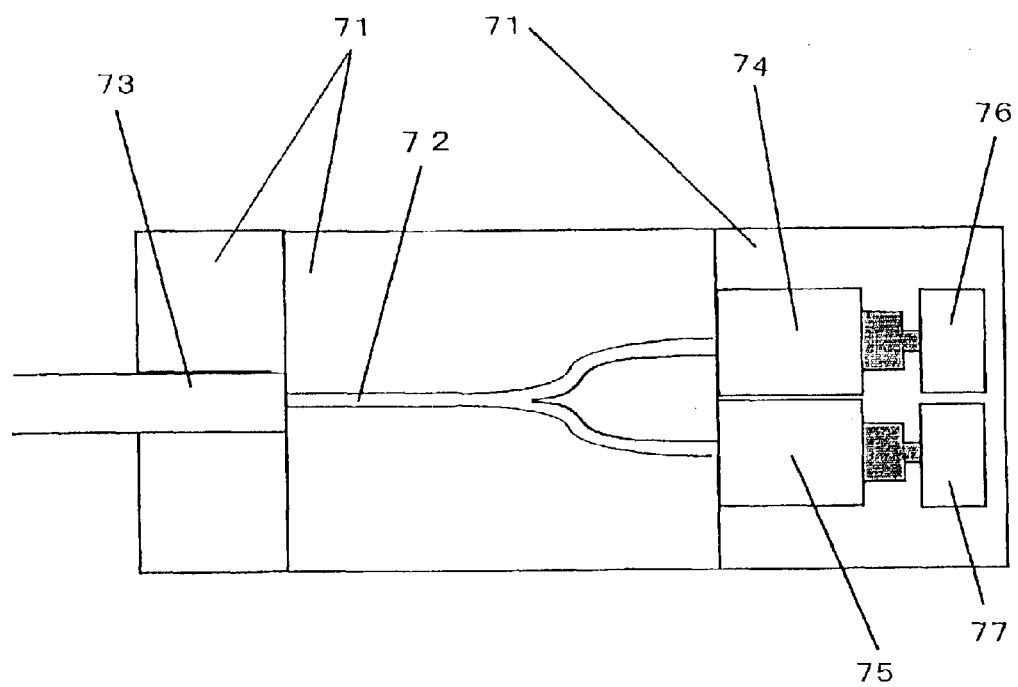
FIG. 7 is a configurating diagram of an optical module of the present invention in a fifth embodiment.
Figure 8:
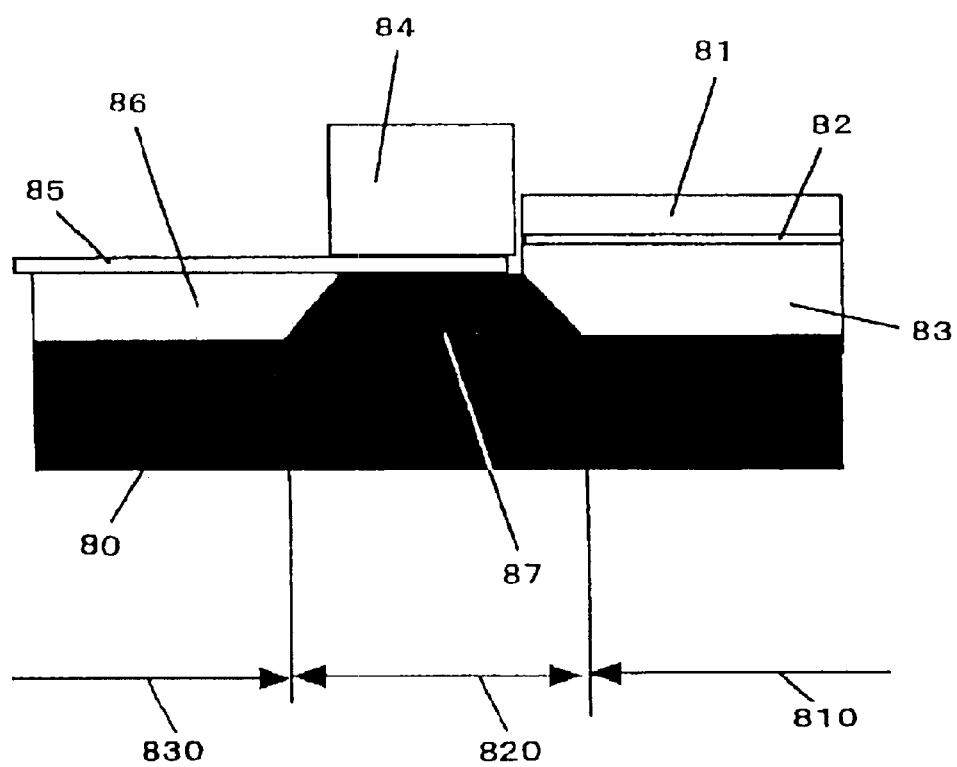
FIG. 8 is a structural cross section of a conventional PLC platform.
Figure 9:
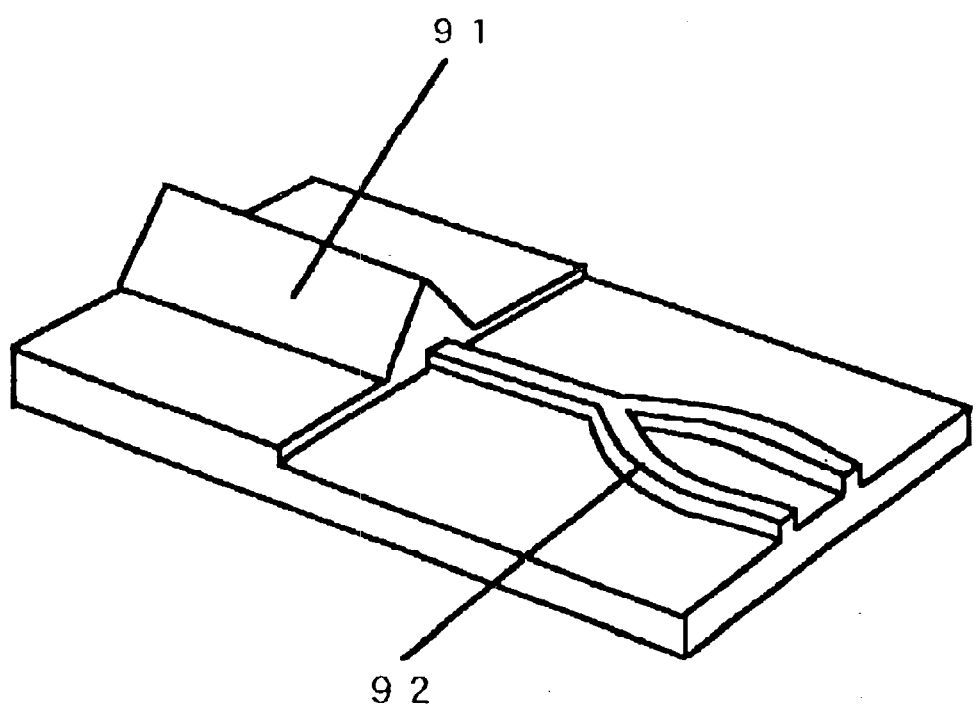
FIG. 9 is a configurating diagram showing a conventional example of a molding die that performs simultaneous molding of an optical fiber fixing groove and an optical waveguide groove.
Figure 10:
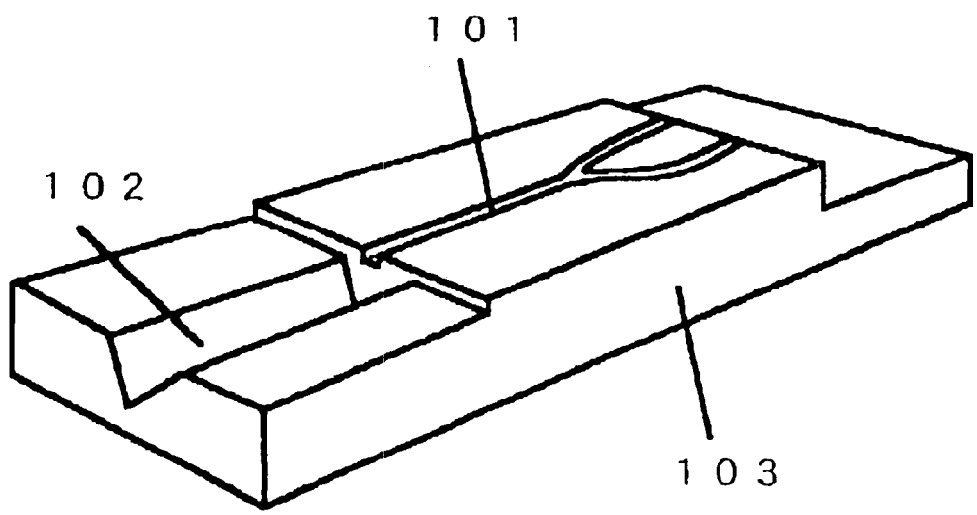
FIG. 10 is a configurating diagram of a conventional optical mount substrate having both of an optical fiber fixing groove and an optical waveguide groove.

FIG. 7 is a configurating diagram showing an optical transmission-reception module that is manufactured on the basis of the optical mount substrate according to the first embodiment of the present invention.

That is, as shown in FIG. 7, the optical transmission-reception module of this embodiment comprises an optical mount substrate 71 with an optical waveguide groove 72 on which an optical fiber 73, optical devices such as a laser 74 and a photodiode 75, and a front end. such as a laser driver 76 and a preamplifier 77 are mounted. In addition, electrodes are made to be in coplanar lines.

According to the optical transmission-reception module in this embodiment, sufficient heat radiation effectiveness can be obtained since an embedded high thermal conductivity material is provided also in the laser driver and preamplifier by using the optical mount substrate of the present invention as a base.

If a Logic LSI and an interface are added to such an optical transmission-reception module, a very low cost optical transmitter-receiver can be constituted.

Furthermore, if the optical transmitter-receiver is connected to an optical signal transmission line such as an optical fiber, an optical transmitter-receiver system can be easily built.

For example, it is effective in an access network that connects a LAN or a base station to a subscriber terminal. Since the optical mount substrate of the present invention is excellent in rapidity and heat radiation effectiveness, it can be used also for an optical module on which a high power device, necessary for a base station, is mounted.

In addition, although this embodiment is described as what is constituted by an optical mount substrate whose base is the optical mount substrate of the first embodiment, it is also good as what is constituted by the optical mount substrate by the third embodiment.

In addition, an optical transfer section of the present invention is equivalent to the optical waveguide groove, plate glass member, glass substrate, and ultraviolet cure resin of each embodiment.

Furthermore, as for an optical mount substrate or the like of the present invention, in the above-described embodiments, as an example of the case of using via holes for electric connection with a high-frequency circuit or a high-frequency device, a case of molding an optical fiber guide section (fiber arranging V groove), an optical transfer section (optical waveguide groove), an arrangement section (a laser mounting section, and photodiode mounting section) in a body is mainly described (FIG. 1(b), and FIG. 2(a) to FIG. 2(d)). However, besides this, for example, it is also good to form these sections at separate steps respectively, or to manufacture them without using a molding die. In short, so long as structure is such that optical devices, and a high-frequency device or a high-frequency circuit are connected through a conductive member embedded in through holes (via holes), any structure may be used, and they are irrespective of what manufacturing method is used for manufacturing.

Even in this case, the effectiveness that an optical mount substrate, an optical module, an optical transmitter-receiver, and an optical transmitter-receiver system that are superior to conventional ones in high frequencies and are accelerable can be provided is demonstrated.

Moreover, as for an embedding method of an electrical conductivity member such as an optical mount substrate of the present invention, in the above-described embodiments, a case where through holes are formed beforehand and it is embedded in the through holes is mainly described (FIG. 2(a) etc.). However, besides this, for example, similarly to the case where the thermal conductivity member is described with FIG. 5(a), it is also good to adopt the method of compulsorily embedding it into a glass substrate by pressing a pillar-shaped electrical conductivity member without providing through holes in the glass substrate beforehand.

Moreover, as for a method of embedding a thermal conductivity member such as an optical mount substrate of the present invention, in the above-described embodiments, the method of compulsorily embedding a pillar-shaped thermal conductivity member into a glass substrate while through holes are not formed beforehand in the glass substrate is described (FIG. 5(a) etc.). However, besides this, for example, similarly to the case where an electrical. conductivity member is described with FIG. 2(a), it is also good to adopt the method of forming through holes in a glass substrate beforehand, and embedding the thermal conductivity member into the through holes.

Moreover, in the above-described embodiments, a case where a thermal conductivity member is constituted in a body by the heat transfer member 52a and heat radiation member 52b is described (FIG. 5(a)). However, besides this, for example, the heat transfer member 52a and heat radiation member 52b that are shown in FIG. 5(a) can also be separated at a manufacturing stage. Namely, in this case, first, a heat transfer member is embedded into the glass substrate 53, and after that, a heat radiation member is arranged on a back face of the glass substrate so as to contact with an end face of the heat transfer member. Although there is a possibility of breaking when a lateral stress is applied to the heat transfer member at the time of pressing if the heat transfer member and the heat radiation member are constituted in a body, a yield in a production process improves since such a problem does not arise if it is the separate structure as mentioned above.

Figure 11:
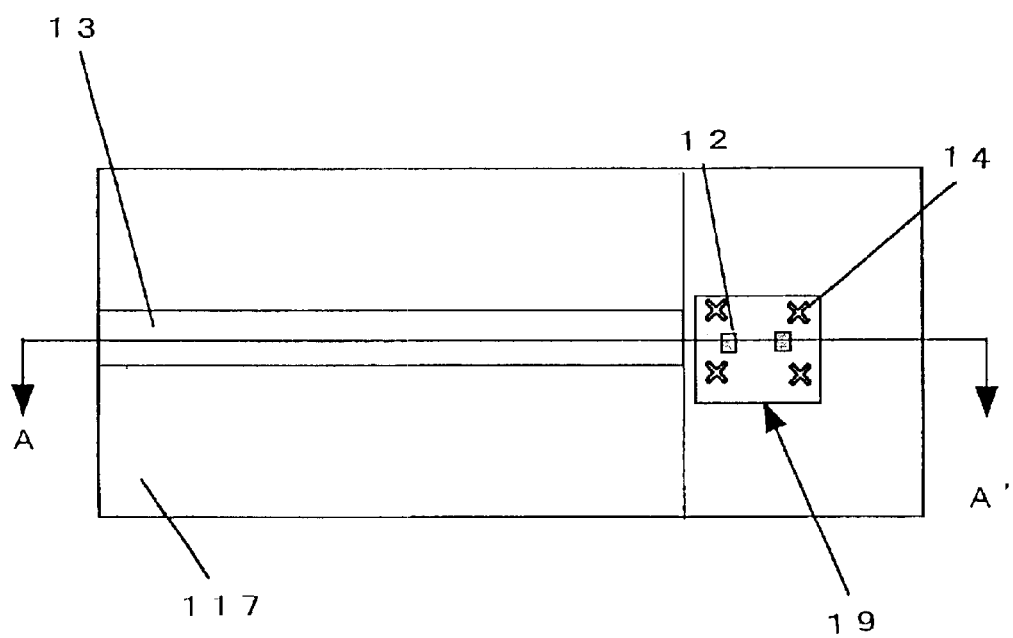
FIGS. 11(a) and 11(b) are configurating diagrams of an optical mount substrate as a modified example of this embodiment having an optical fiber fixing groove and an arrangement section for mounting an optical device.
Figure 11:
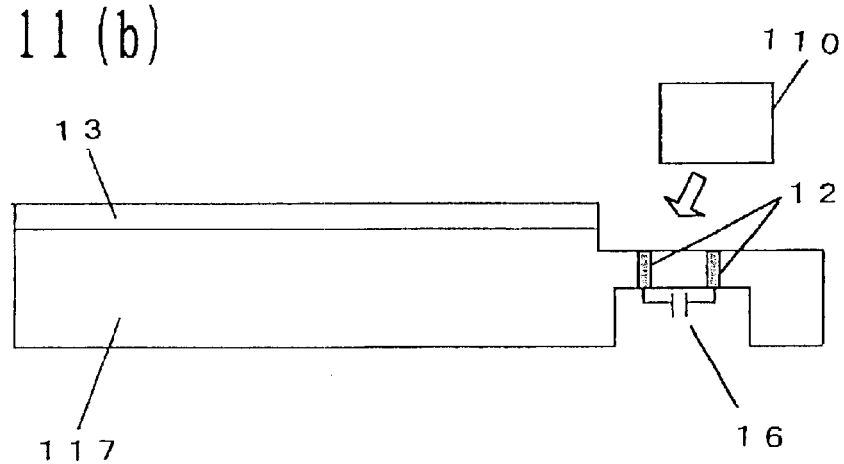

Moreover, in the above-described embodiments, a case where the optical mount substrate includes the optical fiber guide section, optical transfer section, and arrangement section is described (FIG. 1(a) etc.). However, besides this, for example, the structure that does not include the optical transfer section may also be used as shown in FIG. 11(a) and FIG. 11(b).

That is, in this case, the optical fiber (not shown) is directly connected to the photodiode 110 without the optical waveguide intervening, as shown in these figures. In addition, the same reference numerals are assigned to the same objects as the configuration described in FIG. 1(a) and FIG. 1(b). In addition, FIG. 11(a) is a plan of an optical mount substrate of this modified example, and FIG. 11(b) is a sectional view taken along a line A–A' in FIG. 11(a).

Moreover, in the above-described embodiments, a case where respective parts of an optical mount substrate are molded at the same step is mainly described (FIG. 2(a) to FIG. 2(d) etc.). However, besides this, for example, it is also good to form them at respective steps, or it is also good to use a manufacturing method of forming them as separate parts with methods other than molding respectively and finally bonding them in order to integrate respective parts.

Moreover, in the above-described embodiments, the optical mount substrate of the present invention is described as a substrate where an electrical conductivity member or a thermal conductivity member is embedded. However, besides this, for example, a substrate with through holes where an electrical conductivity member or a thermal conductivity member is not yet embedded is also an example of the optical mount substrate of the present invention.

As described above, an example of the present invention is characterized by comprising, for example, a substrate having an optical waveguide groove, a member which has a refraction index equivalent to the above-described substrate and is bonded on the above-described optical waveguide groove, and a material that has a refraction index higher than the above-described substrate and is filled in the above-described optical waveguide groove, and that an electrical conductivity material that is a material different from the above-described substrate and member is partially embedded into the above-described substrate or member.

If such structure is used, an optical waveguide can be easily manufactured, and can be manufactured at a low cost and in high volume. In addition, it is possible not only to reduce the loss and phase delay to high frequencies since it is possible to shorten wire length by embedding an electrical conductivity material in the direction of substrate thickness, but also to perform miniaturization by increasing a degree of integration of a circuit part.

In particular, it is possible to incorporate a high-speed electronic circuit by using a material, having small dielectric loss such as glass for a substrate and a member, and providing high frequency transmission lines such as coplanar lines.

Furthermore, another example of the present invention is characterized by comprising a substrate having an optical waveguide groove, a member which has a refraction index equivalent to the above-described substrate and is bonded on the above-described optical waveguide groove, and a material that has a refraction index higher than the above-described substrate and is filled in the above-described optical waveguide groove, and that a thermal conductivity material that has thermal conductivity higher than the above-described substrate and member is partially embedded into the above-described substrate or member.

If such structure is used, an optical waveguide can be easily manufactured, and can be manufactured at a low cost and in high volume.

In addition, the heat radiation effectiveness can be easily increased by mounting a device, which generates heat, such as a laser, and a semiconductor IC, and a modulation device in a part in which a high thermal conductivity material is embedded in the direction of substrate thickness.

In addition, still another example of the present invention is what optics such as an optical filter, an external modulation device, and an isolator are incorporated between optical waveguide portions.

Thus, multifunctional optical signal processing becomes possible by embedding various kinds of optical devices.

In addition, further another example of the present invention is characterized by comprising an optical fiber, and a photo detector or a light emitting device on the above-described optical mount substrate as an optical module.

Furthermore, still further another example of the present invention is characterized by comprising the above-described optical module with an electric signal processing circuit as an optical transmitter-receiver.

Moreover, another example of the present invention is characterized by comprising an optical signal transmission line and the above-described optical transmitter-receiveres in both ends of the optical signal transmission line as an optical transmitter-receiver system.

In addition, still another example of the present invention is characterized by comprising a step of forming an optical waveguide groove and through holes in a substrate by pressing a mold die under pressure to the substrate heated and softened, and a step of filling the above-described through holes with an electrical conductivity material or a high thermal conductivity material as a manufacturing method of an optical mount substrate. It is possible to form an optical waveguide groove and via holes in a lump by using a molding method with the molding die.

In addition, further another example of the present invention is characterized by comprising a step of arranging an electrical conductivity material or a high thermal conductivity material between a substrate, which is heated and softened, and a mold die, and embedding the above-described electrical conductivity material or high thermal conductivity material into the above-described substrate by pressing the above-described mold die under pressure, as a manufacturing method of an optical mount substrate. It is what a different kind of material is easily embedded into a substrate by using the molding method.

As described above, according to the present invention, it is possible to provide an optical mount substrate, an optical module, an optical transmitter-receiver, and an optical transmitter-receiver system that are superior to conventional ones in high frequencies and are accelerable.

Moreover, according to the present invention, it is possible to manufacture an optical mount substrate at a lower cost than the conventional ones. In addition, it becomes possible to further reduce cost if, for example, an optical fiber fixing guide groove and alignment markers of optical devices are also molded.

Industrial Applicability

As described above, according to the present invention, it is possible to provide an optical mount substrate, an optical module, an optical transmitter-receiver, and an optical transmitter-receiver system that have outstanding heat radiation effectiveness although configuration is simple in comparison with the conventional ones.

Furthermore, according to the present invention, it is possible to provide an optical mount substrate, an optical module, an optical transmitter-receiver, and an optical transmitter-receiver system that can further reduce losses in a high-frequency band in comparison with the conventional ones.

In addition, according to the present invention, it is possible to provide a manufacturing method of an optical mount substrate that can further simplify a production process.

What is claimed is:

1. An optical mount substrate comprising:
   an optical fiber guide section for arranging and fixing an optical transfer section, having an optical waveguide, or an optical fiber; and
   an arrangement section for arranging an optical device optically connected with the optical waveguide or the optical fiber on a first principal plane,
   wherein;
      an electrical conductivity member having a higher apparent initial softening temperature than that of material comprising said arrangement section, which penetrates the through said arrangement section from the first principal plane of the arrangement section to a second principal plane of the arrangement section substantially parallel to the first principal plane; and
      the electrical conductivity member is electrically coupled to the optical device.

2. An optical mount substrate comprising:
   an optical fiber guide section for arranging and fixing an optical transfer section, having an optical waveguide, or an optical fiber; and
   an arrangement section for arranging an optical device optically connected with the optical waveguide or the optical fiber on a first principal plane,
   wherein;
   a thermal conductivity member containing a thermal conductivity material having a higher apparent initial softening temperature than that of material comprising said arrangement section, which penetrates through said arrangement section from the first principal plane of the arrangement section to a second principal plane of the arrangement section substantially parallel to the first principal plane; and
   the thermal conductivity member is thermally coupled to the optical device.

3. The optical mount substrate according to claim 1 or 2, wherein the optical transfer section or the optical fiber guide section, and the arrangement section are constituted with the same material in a body.

4. The optical mount substrate according to claim 1 or 2, wherein the arrangement section is glass.

5. The optical mount substrate according to claim 2, wherein thermal conductivity of the heat transfer member is larger than thermal conductivity of the arrangement section.

6. The optical mount substrate according to claim 2, wherein a heat radiation member containing the thermal conductivity material is thermally coupled to the heat transfer member, and is provided in all or a part of the second principal plane of the arrangement section.

7. The optical mount substrate according to claim 1 or 2, wherein the arrangement section has alignment markers for aligning the optical device.

8. The optical mount substrate according to claim 1 or 2, further comprising a second optical device provided on the optical waveguide.

9. An optical module comprising:
   the optical mount substrate according to any one of claims 1 or 2;
   the optical waveguide or the optical fiber; and
   a photo detector or a light emitting device as the optical device.

10. An optical transmitter-receiver comprising:
    an optical module according to claim 9; and
    an electric signal processing circuit.

11. An optical transmitter-receiver system comprising:
    an optical transmitter-receiver according to claim 10; and
    an optical signal transmission line in one end and the other end of which the optical transmitter-receivers are connected.

12. A manufacturing method of an optical mount substrate comprising:
    a step of forming an optical fiber guide section for arranging and fixing an optical transfer section, having an optical waveguide, or an optical fiber; and
    an embedding step of embedding an electrical conductivity member so that the electrical conductivity member may penetrate a first principal plane of an arrangement section for arranging an optical device optically connected with the optical waveguide or the optical fiber on the first principal plane, and a second principal plane or the arrangement section parallel to the first principal plane;

wherein;

in the step of forming, all or part of said optical transfer section, said optical fiber guide section and said arrangement section is formed by pressing a mold member to a substrate heated and softened to transfer inversion geometry of said mold member onto said substrate; and in the embedding step, said electrical conductivity member, having a predetermined shape, is directly pressed onto said substrate heated and softened to embed into said substrate.

13. The manufacturing method of an optical mount substrate according to claim 12, wherein pressing a mold member in the step of forming and pressing said electrical conductivity member is simultaneously performed.

14. A manufacturing method of an optical mount substrate comprising:

a step of forming an optical fiber guide for arranging and fixing an optical transfer section, having an optical waveguide, an optical fiber; and an embedding step of embedding a thermal conductivity member containing a thermal conductivity material so that the thermal conductivity material may penetrate a first principal plane of an arrangement section for arranging an optical device optically connected with the optical waveguide or the optical fiber on the principal plane, and a second principal plane of the arrangement section parallel to the first principal plane of the arrangement section parallel to the first principal plane;

wherein;

in the step of forming, all or part of said optical transfer section, said optical fiber guide section and said arrangement section is formed by pressing a mold member to a substrate heated and softened to transfer inversion geometry of said mold member onto said substrate; and in the embedding step, said thermal conductivity member, having a predetermined shape, is directly pressed onto said substrate heated and softened to embed into said substrate.

15. The manufacturing method of an optical mount substrate according to claim 14 comprising a heat radiation member arrangement step of forming a heat radiation member, containing a thermal conductivity material, in all or a part of the second principal plane of the arrangement section, and thermally coupling it to the heat transfer member.

16. The manufacturing method of an optical mount substrate according to claim 14, wherein the heat transfer member is formed in a body with a heat radiation member containing thermal conductivity material, and in the embedding step, the heat radiation member is formed in all or a part of the second principal plane of the arrangement section at the same time when the heat transfer member is embedded.

17. The manufacturing method of an optical mount substrate according to claim 14, wherein pressing a mold member in the step of forming and pressing said thermal conductivity member is simultaneously performed.

* * * * *

UNITED STATES PATENT AND TRADEMARK OFFICE
CERTIFICATE OF CORRECTION

PATENT NO. : 6,964,528 B2
DATED : November 15, 2005
INVENTOR(S) : Tsuguhiro Korenaga et al.

It is certified that error appears in the above-identified patent and that said Letters Patent is hereby corrected as shown below:

Column 17,
Line 62, delete "the".

Column 19,
Line 20, after "waveguide," add -- or --.

Signed and Sealed this

Eleventh Day of April, 2006

JON W. DUDAS
*Director of the United States Patent and Trademark Office*